United States Patent

Meyer-Kahrweg

[11] 4,028,883
[45] June 14, 1977

[54] GENERATING PLANT AND METHOD OF STARTING UP A GENERATING PLANT

[75] Inventor: Helmut Meyer-Kahrweg, Wuppertal-Langerfeld, Germany

[73] Assignee: Steag Aktiengesellschaft, Essen, Germany

[22] Filed: July 28, 1975

[21] Appl. No.: 599,384

[30] Foreign Application Priority Data
Aug. 6, 1974 Germany .......................... 2437782

[52] U.S. Cl. ............................ 60/39.04; 60/39.12; 60/39.14; 60/39.16 S; 60/39.5; 60/39.18 B; 60/39.17

[51] Int. Cl.² ...................... F02C 3/26; F02C 7/26

[58] Field of Search ............ 60/39.12, 39.17, 39.14, 60/39.02, 39.04, 39.16 S, 39.16 R, 39.5, 672

[56] References Cited

UNITED STATES PATENTS

| | | | |
|---|---|---|---|
| 2,613,500 | 10/1952 | Lysholm | 60/39.17 |
| 2,654,217 | 10/1953 | Rettaliata | 60/39.17 |
| 2,755,621 | 7/1956 | Terrell | 60/39.17 |
| 3,473,298 | 10/1969 | Berman | 60/39.5 |
| 3,704,586 | 12/1972 | Bruns | 60/39.12 |

*Primary Examiner*—Carlton R. Croyle
*Assistant Examiner*—Robert E. Garrett
*Attorney, Agent, or Firm*—Andrus, Sceales, Starke & Sawall

[57] ABSTRACT

A generating plant is driven by a gas turbine, which is run with combustion gases from gas coming from a carbon pressure reactor and which obtains the combustion air necessary for its operation from a primary compressor driven by the gas turbine by means of a final compressor connected at the outlet side of the primary compressor. The final compressor is driven by an expansion turbine connected between the pressure reactor and the combustion chamber acting to produce the combustion gases. During starting up of such a plant the pressure reactor is operated with extraneous air which is primarily compressed by a starting compressor and further compressed by the final compressor which is powered by a pony motor, the expansion turbine being disconnected until it reaches operating speed.

9 Claims, 1 Drawing Figure

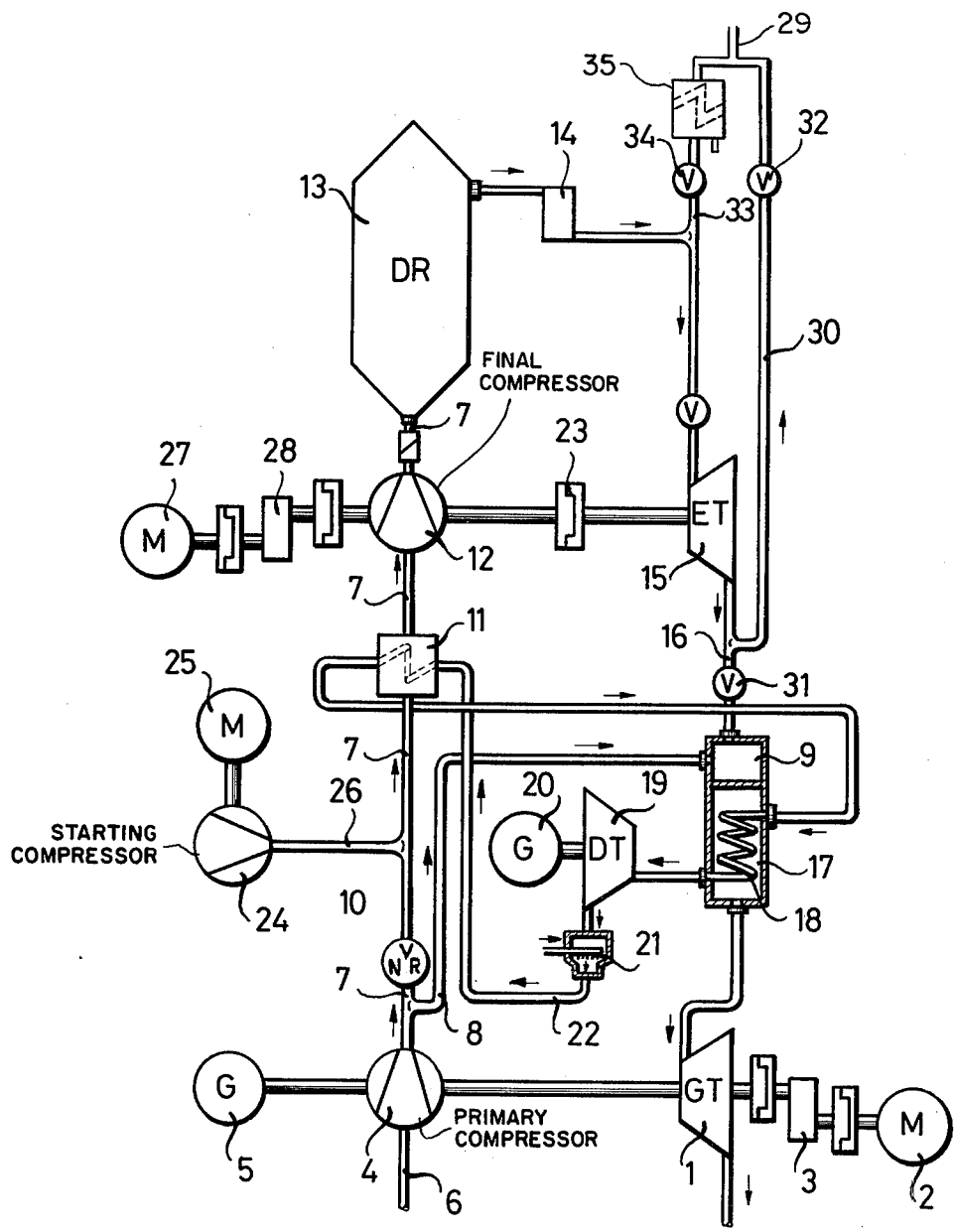

GENERATING PLANT AND METHOD OF STARTING UP A GENERATING PLANT

BACKGROUND OF THE INVENTION

1. Field of the Invention

This invention relates to a method of starting up a generating plant of the kind having a gas turbine driven by combustion gases from a carbon pressure reactor in which the pressure reactor is initially operated with extraneous air from a starting compressor and the starting fuel gas produced used to accelerate an expansion turbine to drive a final compressor. After production of a sufficient amount of fuel gas to put a combustion chamber and the gas turbine into operation, the combustion chamber is coupled to the expansion turbine. The gas turbine drives a primary air compressor so that the supply of extraneous air may be cut off.

Moreover, the invention relates to a generating plant to which this method of starting can be applied.

2. Description of the Prior Art

Plants of the foregoing type run with a relatively high degree of efficiency because relatively higher inlet temperatures are possible in a gas turbine than in steam turbines. The plant is also cheaper. The gas turbine is usually combined with a steam turbine in a power station block. The steam turbine is operated with a steam boiler which is connected at the outlet side of the combustion chamber in which the gas is produced to operate the gas turbine. This gas is formed by combustion of gas or oil. The fuel gas of the combustion chamber is supplied by a pressure reactor if coal is used as fuel. This gas is thus produced in a pressure reactor from the inserted coal, from steam and from corresponding compressed combustion air.

Known plants of this type are usually used for supplying peak loads. They must be able, therefore, to be started up frequently and quickly. Since the combustion air required for starting up the carbon pressure reaction cannot be supplied by the primary compressor, because the gas turbine is not yet in operation then, extraneous or auxiliary air is used for this purpose.

In known plants of this type an air cell and a starting turbine driven by a motor are used. The air cell is designed so that it can supply the necessary combustion air for starting the pressure reactor for a period of about 15 minutes. The combustion chamber is put into operation with ignition oil so that the gas turbine can start and drive the primary compressor. The pressure reactor is started with the extraneous air from the cell. The starting gas arising therefrom is directed away upstream of the expansion turbine and is burned off. This is necessary because the expansion turbine cannot be sufficiently cooled when starting the pressure reactor, but drag losses arise due to the plant members coupled to the expansion turbine, i.e., a pony motor with its gear and the final compressor.

When the pressure reactor produces about 20% of the fuel gas, gas valves upstream of the combustion chamber are opened. As a result the expansion turbine begins to rotate. Only then is the pony motor of the expansion turbine switched on, said motor having to drive both the turbine and the final compressor. Only after the required combustion air is produced by the plant itself, can the supply of extraneous air be switched off.

Such plant has series of grave disadvantages. The combustion chamber must be equipped for combustion of pressure gas and of light oil. This considerably increases the cost of this part of the plant. Also maloperation can arise when starting up the plant. For example if the ignition burner in the combustion chamber fails then the gas turbine cannot be set into operation in time, with the result that the air cell is permatively exhausted. Since loading the cell takes up approximately 3 hours, power supply fails during this time. Moreover, the relatively high consumption of light oil, which arises when starting the plant is of course unfavorable.

Since in the known plant, the expansion turbine, the final compressor and the drive motor are mounted on the same shaft, the turbine must be dragged along when starting the final compressor by means of the motor, whereby friction losses (pump losses) and consequent high heat production occur in the expansion turbine. For this reason the expansion turbine must be cooled with gas from the pressure reactor. Such gas is, however, not available in sufficient quantity in the first starting phase. Thus it is essential to bring the pressure reactor on to producing fuel gas in an unduly short time in order to avoid overheating the expansion turbine.

This quick acceleration of the pressure reactor is disadvantageous to its operation. On the one hand regulation of the pressure reactor in this case may be poorly controlled. On the other hand the quality of the gas deteriorates, excessive fluctuations in quality and also carry over of dust occur. Damage often occurs in the pressure reactor due to a sudden local increase in temperature and to uncontrollable dispersion of the surface steam.

SUMMARY OF THE PRESENT INVENTION

An object of the invention is to make the starting process easier and to accomplish starting up the plant, without ignition oil, exclusively with the gas supplied by the pressure reactor.

According to the invention in one aspect, there is provided a method of starting up a generating plant, the generator of which is driven by a gas turbine, which is operated with combustion gases from gas coming from a carbon pressure reactor and which obtains the combustion air necessary for its operation from a primary compressor driven by the gas turbine, by means of a final compressor connected at the outlet side of the primary compressor, said final compressor being driven by an expansion turbine connected between the pressure reactor and the combustion chamber acting to produce the combustion gases, in which a starting compressor is used for primary compression of extraneous air for operating the pressure reactor during starting up and the final compressor is used for final compression of said extraneous air, the starting gas produced thereby being preferably burnt off and the expansion turbine being at first disconnected from the final compressor which is brought up to the required normal speed, and, when a sufficient amount of fuel gas is produced to put the combustion chamber and the gas turbine into operation, the combustion chamber is connected to the exhaust pipe of the expansion turbine, the supply of extraneous air is shut off and the final compressor is coupled to the expansion turbine.

Thus the starting compressor is used for primary compression of the extraneous air and the final compressor is used for its final compression. The expansion turbine is at first disconnected from the final compressor and is brought to the required normal speed by the starting gas, as the starting gas is burnt off. Then the final compressor is coupled to the expansion turbine, and the combustion chamber and the gas turbine are set in operation with the fuel gas.

In the method according to the invention, therefore, the pressure reactor is first set in operation while the combustion chamber and gas turbine remain switched off until the pressure reactor can make available fuel gas with the required gas pressure and in the necessary quantity. Quantitatively this is usually the case in the method according to the invention when approximately 30% of the quantity of fuel gas produced in operation of the plant is available. The starting gas produced up to this point in time, however, no longer needs to be burnt off, by-passing the expansion turbine, because the latter does not produce any drag losses. For this reason the expansion turbine can start up slowly until it reaches the speed of the final compressor with which it can then be coupled.

The advantages of the method according to the invention first of all consists of an improvement in the degree of efficiency due to the saving in energy described and to simplification of the plant components of the combustion chamber. Other advantages ensue from the fact that the starting of the pressure reactor is no longer under the pressure of time and therefore it is not necessary to have a sufficient quantity of fuel gas available after a certain time. In the method according to the invention one may take as long a time as desired to adjust the correct operational conditions, i.e., especially pressure and quantity of the fuel gas before the combustion chamber, which are required for starting and for operation of the combustion chamber and the gas turbine without ignition oil.

The starting gas produced during the starting of the pressure reactor is expanded immediately by means of the expansion turbine before it is burnt off. As long as the speeds of the expansion turbine are lower than those of the final compressor than the turbine does not need to yield any output. It starts up slowly and finally reaches the speed of the final compressor. When this is the case the production of gas by the pressure reactor is then usually sufficient to be able to set in operation both the combustion chamber and the gas turbine.

According to the invention in another aspect, there is provided a generating plant, the generator of which is driven by a gas turbine, which is operated with combustion gases from gas coming from carbon pressure reactor and which obtains the combustion air necessary for its operation from a primary compressor driven by the gas turbine, by means of a final compressor connected at the outlet side of the primary compressor, said final compressor being driven, via a free-wheeling clutch, by an expansion turbine connected between the pressure reactor and the combustion chamber acting to produce the combustion gases, whereby for starting the plant, the final compressor is driven by a pony motor, the pressure reactor is operated with extraneous air from a starting compressor having its output connected to a pipe leading from the output of the primary compressor and the starting gas produced thereby is preferably burnt off, until after producing a sufficient amount of fuel gas to put the combustion chamber and the gas turbine into operation, the combustion chamber is attached to the exhaust pipe of the expansion turbine and the supply of extraneous air is shut off.

When starting this plant the final compressor, which receives the extraneous air from the starting compressor, is driven by the pony motor until the expansion turbine reaches the speed of the final compressor and is coupled to the final compressor by means of the freewheeling clutch.

Further savings in energy may be obtained in a plant with a steam boiler attached to the combustion chamber, in which boiler steam is produced for the operation of a steam turbine with the condenser connected at its outlet side and, near said steam turbine, the condenser is connected to an air cooler connected on the inlet side of the final compressor by means of a condensate pipe. According to a preferred feature of the invention, the attachment of the starting compressor is placed upstream of the cooler which is cooled by condensation product. Consequently, the condensation product acts to cool the compressed air. The cooling of the air primarily compressed to approximately 7 atmospheres aids its later final compression. Sufficient condensation product is yielded for cooling the air so that the supply of special cooling waters is superfluous.

A bypass pipe to a flame point for gas coming from carbon pressure reactor is located upstream of the expansion turbine for use in the starting process of the plant. A heat exchanger may be built into this bypass pipe for condensing the water vapor present in the starting gas and the hydrocarbons also present therein as well as for using the heat of the starting gas. The starting gas consists in fact of at least 30% water vapor so, when burning off the starting gas in the atmosphere, the flame tends to be extinguished as a result of the low calorific value of the starting gas. Moreover, there are hydrocarbons in the starting gas which pollute the surroundings in the form of droplets of tar when the flame is extinguished.

Finally, the plant according to the invention may be improved to provide greater economy by separation of the condensation product into water and hydrocarbons. The condensed water can be used again, for example, as washing water. The condensed hydrocarbons can either be used in the process of producing gas or in some other way. The waste heat which has been gained may also be used in the plant.

BRIEF DESCRIPTION OF THE DRAWING

The details and further features of the invention are evident from the following description of an embodiment of the invention together with the accompanying drawing, which shows a plant according to the invention in schematic view, said plant acting to produce current to supply peak loads.

DESCRIPTION OF THE PREFERRED EMBODIMENT

The plant shown has a gas turbine 1, which can be accelerated by a drive consisting of a pony motor 2 and a gear 3. Rigidly coupled to the gas turbine 1 are a gas turbine compressor 4 and a generator 5. The gas turbine compressor 4 draws in air by means of an intake stack 6, and compresses it to approximately 7 atmospheres. The primary compressor 4 is designed for compression of approximately 1,000,000 Nm$^3$/h.

The gas turbine compressor 4 passes the primarily compressed air into pipes 7 and 8. Approximately 90% of the compressed air is supplied to a combustion chamber 9, while the remaining 10% reaches a carbon pressure reactor 13 through the pipe 7 by means of a non-return valve 10 located in the pipe 7, an air cooler 11 and a final compressor 12. The air cooled in the air cooler 11 is compressed in the final compressor 12 to approximately 20 atmospheres, which is the reactor pressure.

Besides the compressed air, coal and steam are also supplied to the carbon pressure reactor, which is not shown in detail. The gas produced in the carbon pressure reactor passes via a gas purifier 14, to an expansion turbine 15 in which it expands to approximately 10 atmospheres. The expansion turbine 15 is used to drive the final compressor 12 to which it is coupled by a free-wheeling clutch 23.

The expanded gas passes via a pipe 16 to chamber 9 from the expansion turbine 15 and is burnt there with the air conducted through the pipe 8.

A steam boiler 17 is attached to the combustion chamber 9, the heating pipes 18 of which are supplied with boiler feed water by a boiler feeder (not shown). The steam produced in the steam boiler 17 acts to drive a steam turbine 19, which is coupled to a generator 20.

The steam expanded in the steam turbine 19 condenses in a condenser 21. The condenser 21 is connected to the air cooler 11 by a condensate pipe 22 so that the condensation product is used to cool the air compressed in the primary compressor 4.

The gases burnt in the combustion chamber 9, after passing the steam boiler 17, act to drive the gas turbine 1.

The plant is started up in two stages. First the carbon pressure reactor 13 is started. The extraneous or auxiliary air necessary for the starting process of the carbon pressure reactor 13 is produced by a starting compressor 24, which is driven by a motor 25. The starting compressor 24 can compress about 40,000 Nm³/h to approximately 7 atmospheres. This primarily compressed air is passed into the pipe 7 by a pipe 26. The pipe 26 is attached to the pipe 7 downstream from the non-return value 10 so that the air compressed in the starting compressor 24 cannot reach the gas turbine compressor 4.

The air released from the starting compressor 24 is further compressed up to the reactor pressure of approximately 20 atmospheres, in the final compressor 12, which has its own drive consisting of a motor 27 and a gear 28. The corresponding supply of steam and coal for the production of gas in the carbon pressure reactor 13 now takes place. The gas produced in the carbon pressure reactor 13 is directed to the expansion turbine 15 via the gas purifier 14, the turbine 15 starting up slowly according to the rate of production of gas because it is separated from the final compressor 12 by the free-wheeling clutch 23.

The gas coming out of the expansion turbine 15 is lead away by a gas duct 30 leading to a flame point 29 where it is burnt off in the atmosphere. In order that this gas does not reach the combustion chamber 9, a quick-acting gate valve 31 is located in the pipe 16 between the point of attachment of the gas duct 30 and the combustion chamber 9, said valve being closed during the starting process. This quick-acting gate valve 31 can also be used to shut down the plant on occurrence of operational disruptions.

When the carbon pressure reactor 13 supplies approximately 30% of its quantity of gas produced in full load conditions, the gas turbine 1 is accelerated by the motor 2 and the gear 3. In addition the quick-acting gate valve 31 is opened and a gate valve 32 located in the gas duct 30 is closed. The gas then streams into the combustion chamber 9 and is ignited there. The gas turbine 1 is driven by the combustion gases, the output of the turbine being sufficient to drive the gas turbine compressor 4. The starting compressor 24 may therefore be switched off. The motor 27 for driving the final compressor 12 is then relieved of part of its load because in the mean-time the expansion turbine 15 has reached such a speed that the free-wheeling clutch 23 connects. However the output of the expansion turbine 15 is not alone sufficient to drive the final compressor 12. The output for producing reaction in the compressor 12 is brought up between 40 and 100% jointly by the motor 27 and the expansion turbine 15. The final operating conditions of the plant are adjusted in a short time so that a power output may be fed to the power supply by the generators 5 and 20.

Since after switching off the plant, the production of gas of the carbon pressure reactor 13 does not immediately finish, the carbon pressure reactor 13 is connected to the flame point 29 by a pipe 33 in which a gate valve 34 is also located. The remaining gas still existing after switching off the plant is thus burnt off.

A heat exchanger 35 is built into the gas pipe 33 to the flame. Said exchanger condenses the water vapor and the hydrocarbons from the starting gas so that the calorific value of the gas is increased accordingly and the flame remains stable.

The condensed water can be used again. The condensed tar is collected and used in the process of producing gas or in some other way. The waste heat gained in the heat exchanger can also be used in the plant or in some other way.

What I claim is:

1. A method of starting up a generating plant, a generator of which is driven by a gas turbine operable by combustion gases produced from gas coming from a carbon pressure reactor, the carbon pressure reactor obtaining the combustion air necessary for its operation from a primary compressor driven by the gas turbine and a final compressor connected at the outlet side of the primary compressor and driven by an external power source and an expansion turbine connected between the pressure reactor and a combustion chamber which produces the combustion gases, said plant having a starting compressor for providing combustion air to the final compressor during start up, said method comprising the steps of:

energizing the starting compressor to compress auxiliary air for the carbon pressure reactor;

energizing the final compressor with the external power source independently of the expansion turbine to further compress the auxiliary air and provide same to the carbon pressure reactor;

operating the carbon pressure reactor responsive to the supply of compressed auxiliary air to produce combustible gases;

accelerating the expansion turbine toward operating speed with the combustible gases;

supplying the combustible gas to the combustion chamber when the quantity of gas produced exceeds a predetermined level and burning it there to produce combustion gases;

driving the gas turbine and primary compressor with the combustion gases from the chamber;

deenergizing the starting compressor; and transferring the energization of the final compressor from the external power source to the expansion turbine in accordance with the supply of combustible gases from the carbon pressure reactor.

2. A generating plant comprising:
- a gas turbine coupled to, and driving, a generator and a primary compressor for providing compressed air;
- a final compressor having an input coupled to said primary compressor and an output;
- a drive means for said final compressor including an expansion turbine connected to said final compressor through a free wheeling clutch for driving said final compressor in accordance with a gas supply quantity and including a motive power source for driving said final compressor until said expansion turbine is capable of driving same;
- a starting compressor connected to the input of said final compressor;
- a carbon pressure reactor having an input coupled to said final compressor for receiving compressed air therefrom and having an output couplable to said expansion turbine and providing combustible gases;
- a combustion chamber coupled to said expansion turbine for receiving and burning the combustible gas and having an output coupled to said gas turbine for providing combustion gases thereto; and
- diversion means between said expansion turbine and said combustion chamber for diverting the combustible gas from said combustion chamber when the gas quantity is less than a predetermined quantity.

3. A plant according to claim 2, in which, upstream of the expansion turbine, there is a bypass pipe to a flame point for gas coming from the carbon pressure reaction.

4. A plant according to claim 3, in which a heat exchanger is built into the pipe leading to the flame point for condensing the water vapor contained in the starting gas and the hydrocarbons contained therein as well as for using the heat from the starting gas.

5. A plant according to claim 4, including means for separating water and hydrocarbons of the condensation product.

6. A method according to claim 5 wherein the combustible gases are diverted from the combustion chamber when the quantity of gas produced by the carbon pressure reactor is below a predetermined level.

7. A method according to claim 6 including the step of thermally treating the diverted gases for extracting condensation products.

8. A method according to claim 6 wherein the combustible gases are diverted from the combustion chamber until the quantity of gas produced is approximately 30% of the full load quantity.

9. A plant according to claim 2 further including a boiler coupled to said combustion chamber for heating a working fluid and to a condensor for condensing the fluid and wherein a gas cooler cooled by the condensate from said condenser is interposed between said starting compressor and the input of said final compressor.

* * * * *